Aug. 10, 1948.  F. D. REED  2,446,609
RELEASABLE AIRPLANE CABIN
Filed May 17, 1947  2 Sheets-Sheet 1
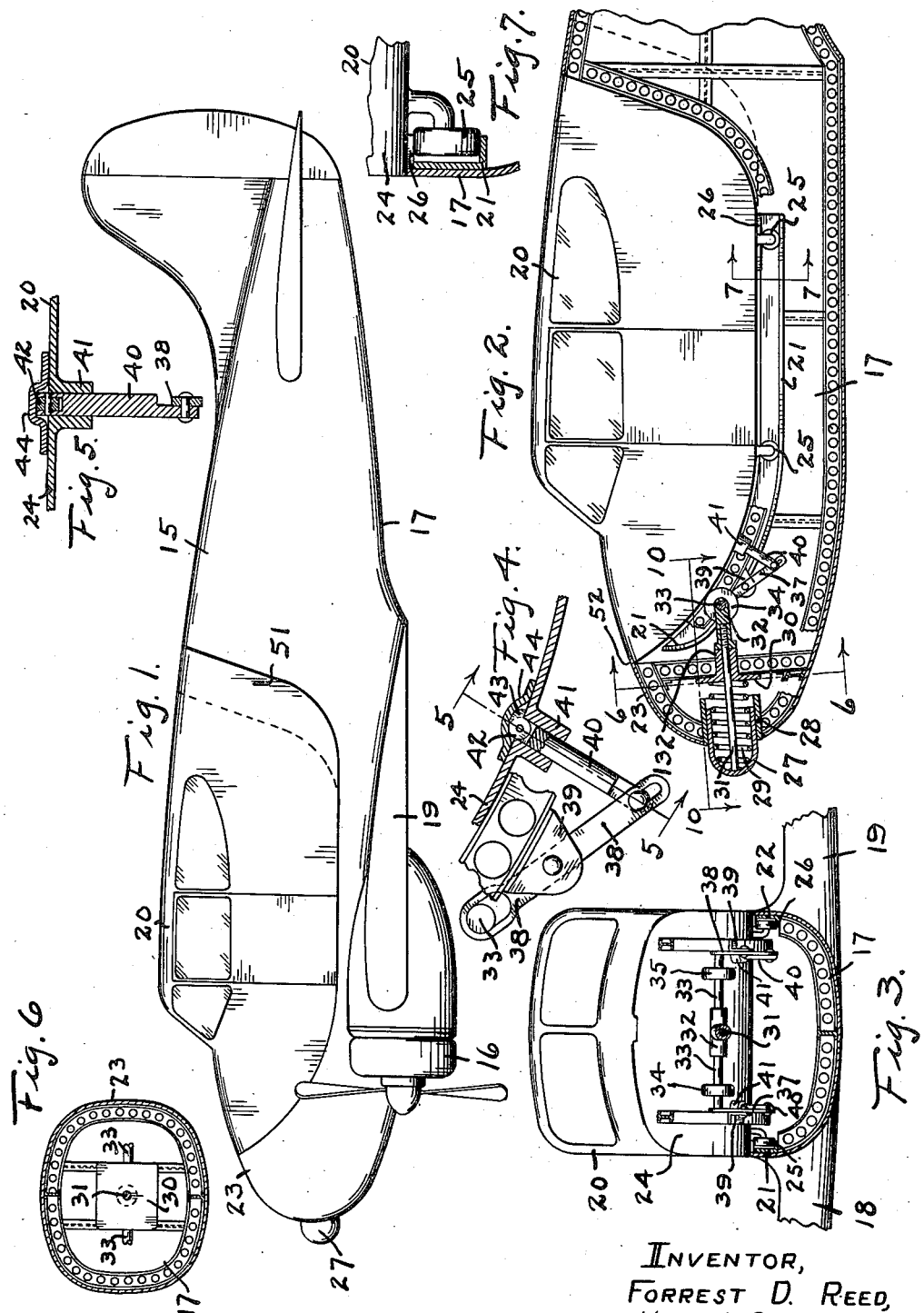
INVENTOR,
FORREST D. REED,
By Herbert A. Minturn,
ATTORNEY.

Aug. 10, 1948. F. D. REED 2,446,609
RELEASABLE AIRPLANE CABIN
Filed May 17, 1947 2 Sheets-Sheet 2
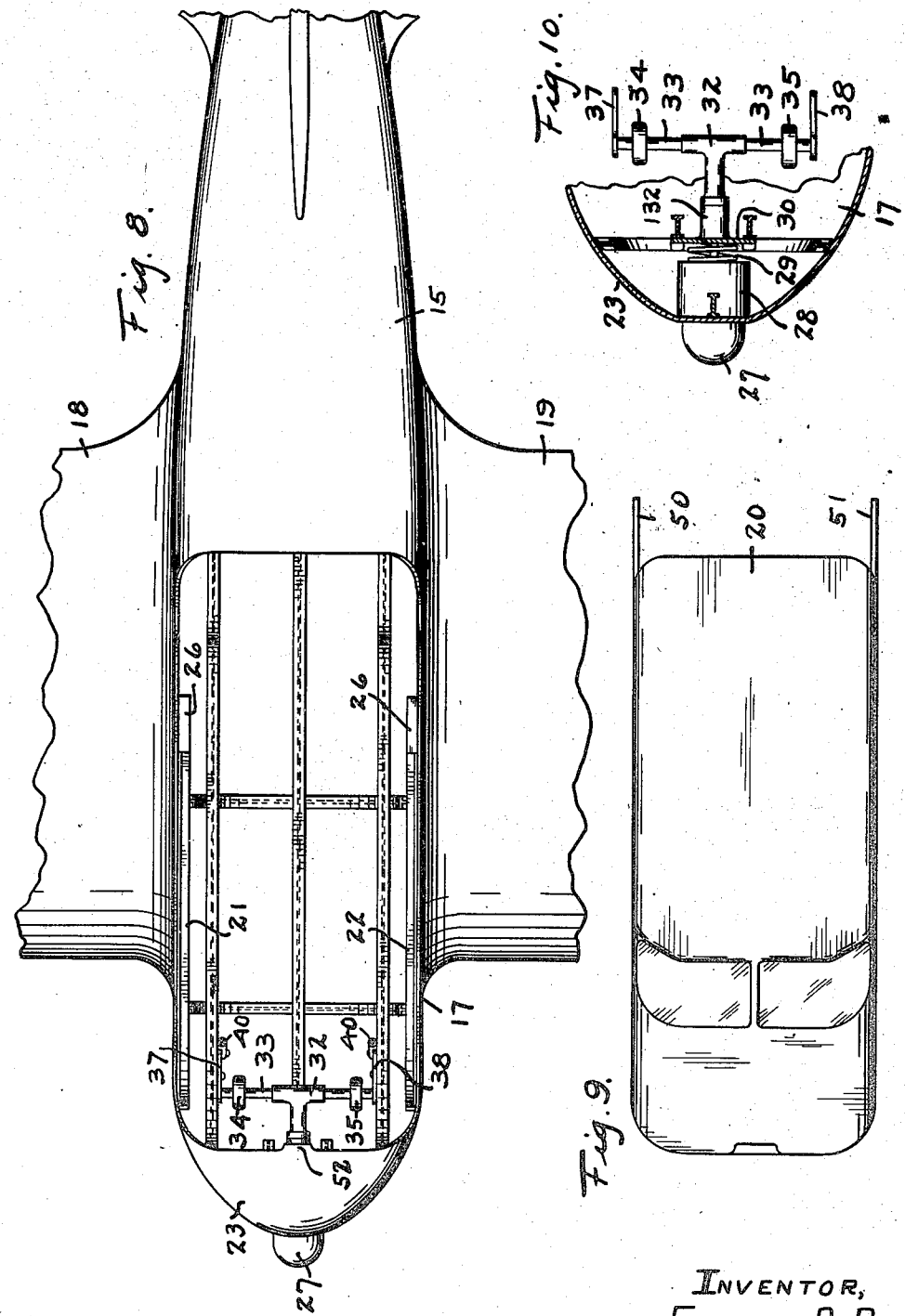
INVENTOR,
FORREST D. REED,
By Herbert A. Minturn
ATTORNEY.

Patented Aug. 10, 1948

2,446,609

UNITED STATES PATENT OFFICE 2,446,609

RELEASABLE AIRPLANE CABIN

Forrest D. Reed, St. Paul, Ind.

Application May 17, 1947, Serial No. 748,721

6 Claims. (Cl. 244—121)

This invention relates to an airplane and particularly to means for releasing a pilot and passenger compartment to permit the compartment to travel on forwardly of the plane upon impact of the plane with some such subject as striking the ground or a mountain side and the like.

A primary object of the invention is to allow the passenger compartment to free itself from the plane proper and hence be removed from the hazards of igniting gasoline tanks when the plane is forcibly stopped by striking the ground or some other immovable object. In connection with this primary object, other objects are embodied in the invention such as provisions for retaining the compartment firmly in proper position when the plane is normally operating; means for quickly releasing the compartment; and means insuring that the compartment will be initially lifted in order to provide the proper angle of contact with the ground as it leaves the plane to insure that the compartment may glide forwardly thereof.

It is contemplated that the various controls and instruments normally appearing within the compartment of the pilot be releasably connected with the plane proper in order to permit separation of the compartment from the plane. The details of such connection do not form a part of the present invention and are therefore not illustrated nor described.

Other objects and advantages of the invention will become apparent to those versed in the art in the following description of one particular form of the invention as illustrated in the accompanying drawings, in which Fig. 1 is a view in side elevation of an airplane to which the invention is applied;

Fig. 2, a detail in side elevation and partial section of the forward part of the fuselage of the plane;

Fig. 3, a detail in front elevation and partial section of the compartment to fuselage connection;

Fig. 4, a detail on an enlarged scale in side elevation and partial section of the interlocking mechanism;

Fig. 5, a section on the line 5—5 in Fig. 4;

Fig. 6, a vertical section through the nose of the fuselage on the line 6—6 in Fig. 2;

Fig. 7, a detail in section on the line 7—7 in Fig. 2;

Fig. 8, a top plan view of the central portion of the fuselage with the passenger compartment removed;

Fig. 9, a top plan view of the passenger compartment only, and

Fig. 10, a detail in section on the line 10—10 in Fig. 2.

Referring to the drawings, in which like parts are designated by like numerals, the invention is illustrated in a two-engine type of plane 15 wherein a motor 16 is carried on each side of a central fuselage 17 on the wings 18 and 19. Preferably the plane 15 is further of the low wing type.

The fuselage 17 is constructed to receive thereon from its top side the separate, rigidly built pilot and passenger compartment 20, which, when in place normally appears and functions in the usual manner as a part of the plane 15 to complete the flow lines thereacross.

On each side of the fuselage 17 is fixed respectively the tracks 21 and 22. Each track 21 and 22 is essentially L shape throughout its major length. The rear portions of these tracks are substantially parallel with the undersides of the wings 18 and 19, while the forward end portions of these tracks curve upwardly toward the top skin of the nose 23 of the fuselage 17.

The underside of the compartment 20, particularly the forward portion thereof curves around and upwardly by the floor 24 following substantially the curve of the tracks 21 and 22. Incidentally, this floor 24 is preferably made to withstand puncture or distortion under considerable impact. Extending below and fixed to the compartment 20 are wheels 25, two on each side and spaced apart a distance fore and aft to rest upon the horizontal flanges respectively of the tracks 21 and 22, Figs. 2, 3 and 7. The rear ends of the tracks 21 and 22 are provided each with a top side inturned flange 26 spaced above the lower flange of the track a distance sufficient to permit the rear wheels 25 to fit rather snugly between the top flange 26 and the lower track flange.

In the forward end of the nose 23 there is positioned a retractable impact plunger 27. This plunger 27 normally extends outwardly from the nose and is presented on that part of the nose most likely to strike the ground upon falling of the plane upon a hill side and the like. In the form herein shown, this plunger 27 is shown as being shell-shaped closed on its outer end with a rounded surface and open at its inner end. It is slidingly guided within a sleeve 28 fixed within the nose 23. A compression spring 29 is carried within the shell plunger 27 to extend rearwardly into the nose 23 and abut some fixed surface such as the plate 30, Figs. 2 and 6. A rod 31 extends axially through the plunger 27 and the spring 29, and 132 slidingly enters the plate 30 and the boss 32 on the rear side thereof to engage a T head 32.

This head 32 is fixed on a cross shaft 33. On the shaft 33 spaced respectively on each side of the head 32 are wheels or rollers 34 and 35 normally in contact with the forward upturned floor 24 of the passenger compartment 20.

Thus upon inward travel of the plunger 27 these rollers 34 and 35 pushing against the upwardly curved floor 24 will lift the forward portion of the compartment 20 to rock it upon the two rear wheels 25. This lifts the two forward compartment wheels 25 free of the tracks 21 and 22. Now in order to insure that the compartment 20 remains securely fixed in position on the fuselage 17 while the airplane is in normal usage, some interlocking mechanism must be employed which will be automatically released upon inward travel of the plunger 27.

One particular form of such an interlocking mechanism is herein shown on each outer end of the shaft 33 there is attached respectively levers 37 and 38 by slotted connections through their upper ends. These levers 37 and 38 are pivoted intermediate their ends each by a bracket 39 fixed to a part of the frame of the fuselage. To each of the opposite ends of the levers 37 and 38 is pivotally interconnected through slots a post 40 which in turn extends upwardly through a guide 41 fixed to the underside of the compartment 20. The top of the post 40 in each instance, carries a dog 42 revolubly mounted thereon. As indicated in Fig. 4, this dog 42 has a heel portion of a diameter substantially equal to the bore through the guide 41 and carries the extended nose 43 which will rock over and turn down on the top side of the floor 24 when pushed upwardly against a cap 44 that is dome-shaped and mounted over the bore through the guide 41. The spring 29 exerts sufficient force to retain the posts 40 in their upper positions to hold the dogs 42 in the floor engaging position as indicated in Fig. 4. Then upon inward travel of the plunger 27, the levers 37 and 38 are rocked to pull these posts 40 downwardly to disengage these dogs 42 and thereby release of the forward end of the compartment 20 as the rollers 34 and 35 push upwardly on that portion of the compartment.

Thus as the plunger 27 may be forced inwardly, the forward end of the compartment 20 is released and elevated so that by reason of the upwardly curved portion of the compartment 20, it will glide on out freely over the nose 23 and slide on the ground or roll on the wheels 25 until the compartment 20 comes to rest of its own accord or brakes may be applied to the individual wheels 25. The compartment 20 is herein shown as having its sides provided with metal wing portions 50 and 51 to extend rearwardly along the skin of the fuselage 17 so as to cover the opening across the rear end of the compartment 20 in the adjoining portion of the fuselage. As above indicated, when the compartment 20 is catapulted from the fuselage 17 by the sudden stoppage of the fuselage, the controls and instruments which have connections running into the fuselage 17 are releasably disengaged. As indicated in Fig. 2, the skin of the fuselage 17 at the top rear end of the nose portion 23 has a slight overlapping on the forward topside of the compartment 20 as designated by the numeral 52 so that no gap is left there for entrance of water and the like under normal conditions. However, under the impact, the forward end of the compartment 29 will lift the end free of this overlapping or bend it upwardly since it is made out of rather soft material and under the impacted conditions imposed would offer slight resistance to the elevation of the front end of the compartment.

Therefore, while I have herein shown and described my invention in the one particular form, it is obvious that structural variations may be employed without departing from the spirit of the invention and I therefore do not desire to be limited to that precise form beyond the limitations which may be imposed by the following claims.

I claim:

1. An airplane fuselage; track means carried by the fuselage; a compartment unit carried by the fuselage on said track means normally shiftable forwardly under inertia effect; an impact member shiftably carried by said fuselage at a forward portion thereof; means operated by travel of said impact member to elevate in reference to said fuselage the forward end of said unit upon driving said impact member inwardly of the fuselage as may be induced by collision conditions.

2. An airplane fuselage; a removable compartment unit carried by the fuselage; track members on the fuselage supporting said unit; means for releasably holding said unit against shifting along said track members; an impact member shiftably carried by said fuselage to be driven inwardly thereof under impact of a collision; and means actuated by travel of said impact member to release said holding means; whereby said unit may, upon collision stopping motion of the fuselage, shoot forwardly from the fuselage under inertia effect; said unit being provided with an upwardly inclined under surface to aid it in taking a gliding upright course upon leaving the fuselage; and means at the rear portion of said unit restraining that portion against lifting until said holding means has been released.

3. An airplane fuselage; a removable compartment unit carried by the fuselage; track members on the fuselage supporting said unit; means for releasably holding said unit against shifting along said track members; an impact member shiftably carried by said fuselage to be driven inwardly thereof under impact of a collision; and means actuated by travel of said impact member to release said holding means; whereby said unit may, upon collision stopping motion of the fuselage shoot forwardly from the fuselage under inertia effect; said unit being provided with an upwardly inclined under surface to aid it in taking a gliding upright course upon leaving the fuselage; and means at the rear portion of said unit restraining that portion against lifting until said holding means has been released; and means actuated by travel of said impact member to elevate relative to said fuselage the front end portion of said unit.

4. The combination of a fuselage; a separate compartment unit inserted from the top side of the fuselage and continuing in effect the unit's outside walls the surface of said fuselage thereacross to afford the desired flow surfaces; track members carried by the fuselage longitudinally thereof; fore and aft spaced apart support members on said unit resting on said track members to be constrained thereby to fore and aft travel thereof; means restraining the rear support members against travel vertically relative to the fuselage; an impact shiftable member carried by said fuselage to extend by one end portion therefrom; unit tilting means adjacent the forward under portion of said unit; means interconnecting said impact member and said tilting means to actuate the tilting means upon travel of the impact means when in collision whereby the unit is rocked upwardly by its forward end relative to the fuselage.

5. The combination of a fuselage; a separate compartment unit inserted from the top side of the fuselage and continuing in effect the unit's outside walls the surface of said fuselage thereacross to afford the desired flow surfaces; track members carried by the fuselage longitudinally thereof; fore and aft spaced apart support members on said unit resting on said track members to be constrained thereby to fore and aft travel thereof; means restraining the rear support members against travel vertically relative to the fuselage; an impact shiftable member carried by said fuselage to extend by one end portion therefrom; unit tilting means adjacent the forward under portion of said unit; means interconnecting said impact member and said tilting means to actuate the tilting means upon travel of the impact means when in collision whereby the unit is rocked upwardly by its forward end relative to the fuselage; and at least one fuselage-unit interlocking member; link means between said impact member and said interlocking member shifting it to an unlatched condition upon said impact means travel.

6. In an airplane, a compartment unit; a fuselage formed to have a depression to receive therein the unit; tracks carried by the fuselage; fore and aft spaced apart wheels on said unit riding on said tracks; a flange turned over the rear wheels to restrain them against vertical travel when in their rearmost position; the forward end of said unit having an under surface sloping upwardly, said fuselage having a nose portion under said unit sloping end; a plunger reciprocatably carried by said fuselage adjacent said unit forward end and extending outwardly from the fuselage; yielding means normally retaining the plunger in said extending position; said tracks having their forward ends upturned under said unit sloping surface; roller means shiftable with travel of said plunger against said sloping surface to elevate that surface upon inward travel of the plunger; latch means normally retaining said unit in fixed position over and along said tracks; and connections between that latch means and said plunger shiftable with the plunger to withdraw the latch means upon said inward travel thereof.

FORREST D. REED.

REFERENCES CITED

The following references are of record in the file of this patent:

UNITED STATES PATENTS

| Number | Name | Date |
|---|---|---|
| 1,251,896 | Krogel | Jan. 1, 1918 |
| 1,628,098 | Abreu | May 10, 1927 |
| 1,721,437 | Durham | July 16, 1929 |
| 1,923,963 | Ayad | Aug. 22, 1933 |
| 2,147,550 | Sabothe | Feb. 14, 1939 |